(12) United States Patent
Sakurai et al.

(10) Patent No.: US 8,300,340 B2
(45) Date of Patent: Oct. 30, 2012

(54) MAGNETIC RECORDING MEDIUM

(75) Inventors: Masatoshi Sakurai, Tokyo (JP);
Ryosuke Yamamoto, Kawasaki (JP);
Naoko Kihara, Kawasaki (JP); Akiko Yuzawa, Yokohama (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 13/039,158

(22) Filed: Mar. 2, 2011

(65) Prior Publication Data
US 2011/0242706 A1 Oct. 6, 2011

(30) Foreign Application Priority Data

Mar. 30, 2010 (JP) .................. 2010-078861

(51) Int. Cl.
*G11B 5/09* (2006.01)
*G11B 21/02* (2006.01)
*G11B 5/82* (2006.01)
*G11B 5/64* (2006.01)

(52) U.S. Cl. ............. 360/48; 360/75; 360/135; 428/826
(58) Field of Classification Search .................. None
See application file for complete search history.

(56) References Cited

FOREIGN PATENT DOCUMENTS

| JP | 2002-279616 A | 9/2002 |
|----|---------------|--------|
| JP | 2002-334414 A | 11/2002 |
| JP | 2004-342226 A | 12/2004 |
| JP | 2005-108361 A | 4/2005 |
| JP | 2005-122820   | 5/2005 |
| JP | 2007-272962 A | 10/2007 |
| JP | 2009-193636   | 8/2009 |

OTHER PUBLICATIONS

Notice of Reasons for Rejection mailed by the Japan Patent Office on Aug. 9, 2011 in the corresponding Japanese App. No. 2010-078861 in 9 pages.
Concise Explanation of Relevance for JP 3927146 (information Sheet for Preparing an Information Disclosure Statement Under Rule 1.56).

*Primary Examiner* — Regina N Holder
(74) *Attorney, Agent, or Firm* — Knobbe, Martens, Olson & Bear, LLP

(57) ABSTRACT

According to one embodiment, a servo area of a magnetic recording medium includes magnetic dots arrayed at a period $L_0$. The magnetic dots include a plurality of magnetic dot regions divided in the cross track direction. A width Wm in the down track direction of the mth magnetic dot region from the innermost circumference and a number Nm of dot rows in the down track direction of the mth region meet a relationship represented by $$L0\{Nm\sqrt{3}/2-0.3\} \leq Wm \leq L0\{Nm\sqrt{3}/2+0.3\} \quad (1).$$

5 Claims, 11 Drawing Sheets

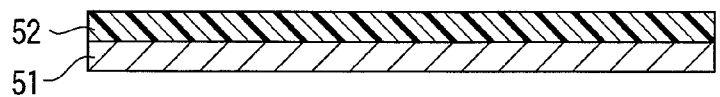
F I G. 10A
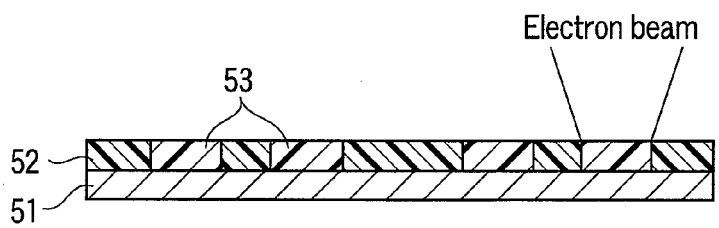
F I G. 10B
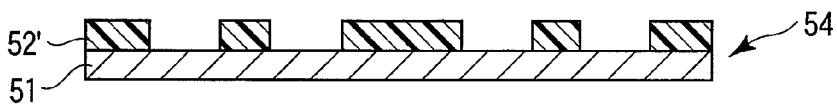
F I G. 10C
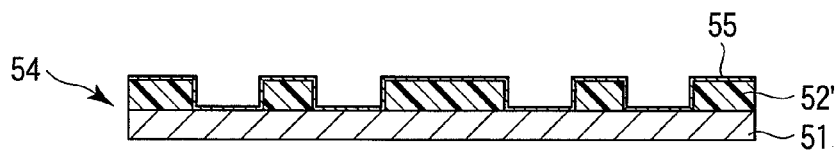
F I G. 10D
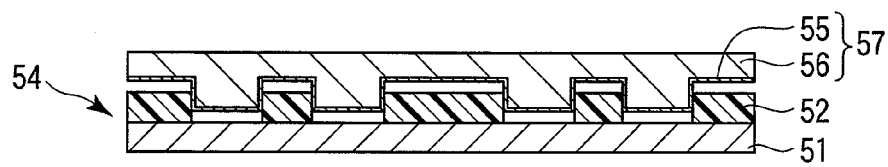
F I G. 10E
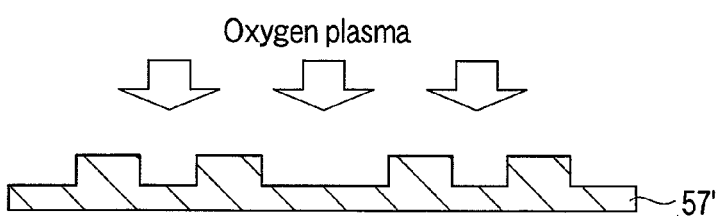
F I G. 10F

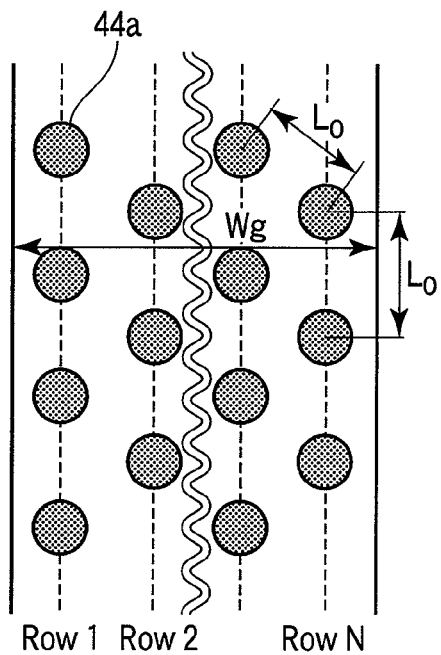
F I G. 12
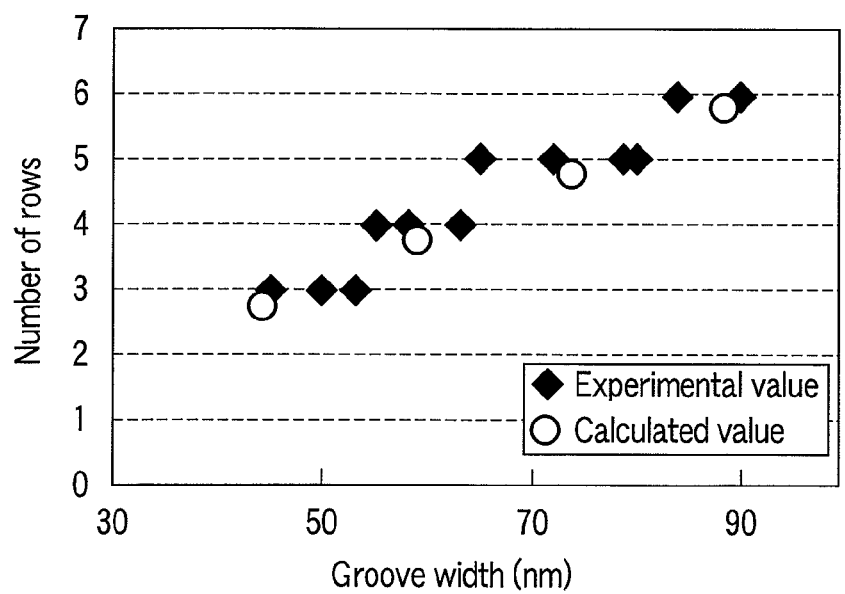
F I G. 13

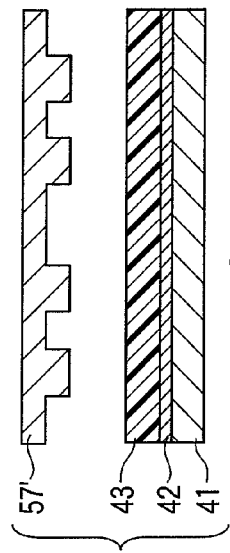
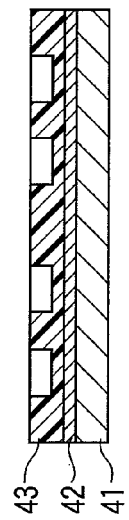
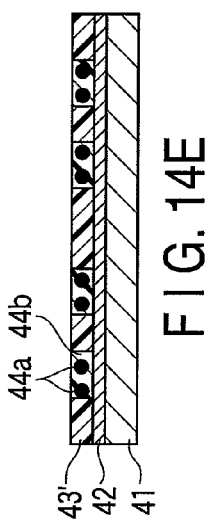
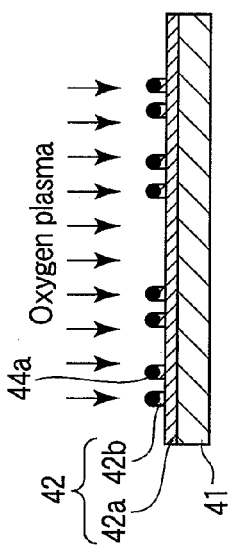
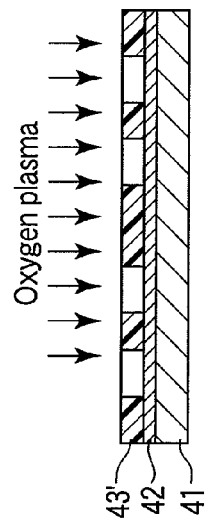
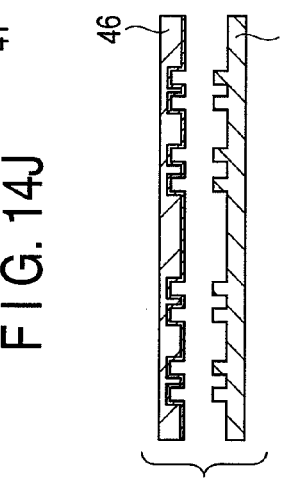
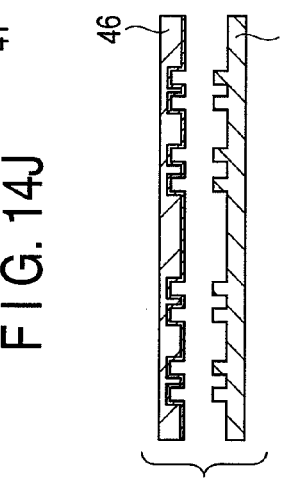
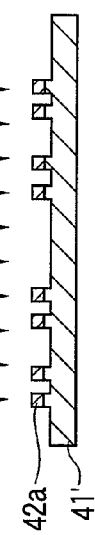
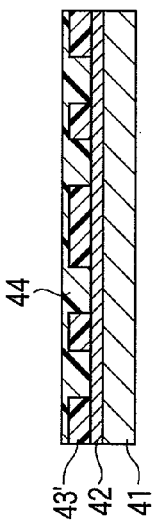
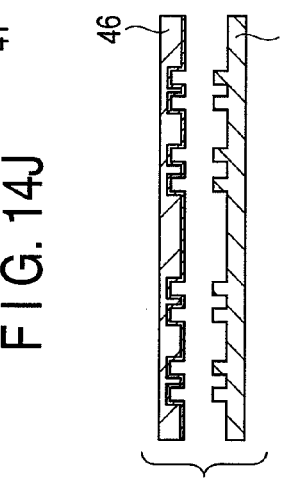

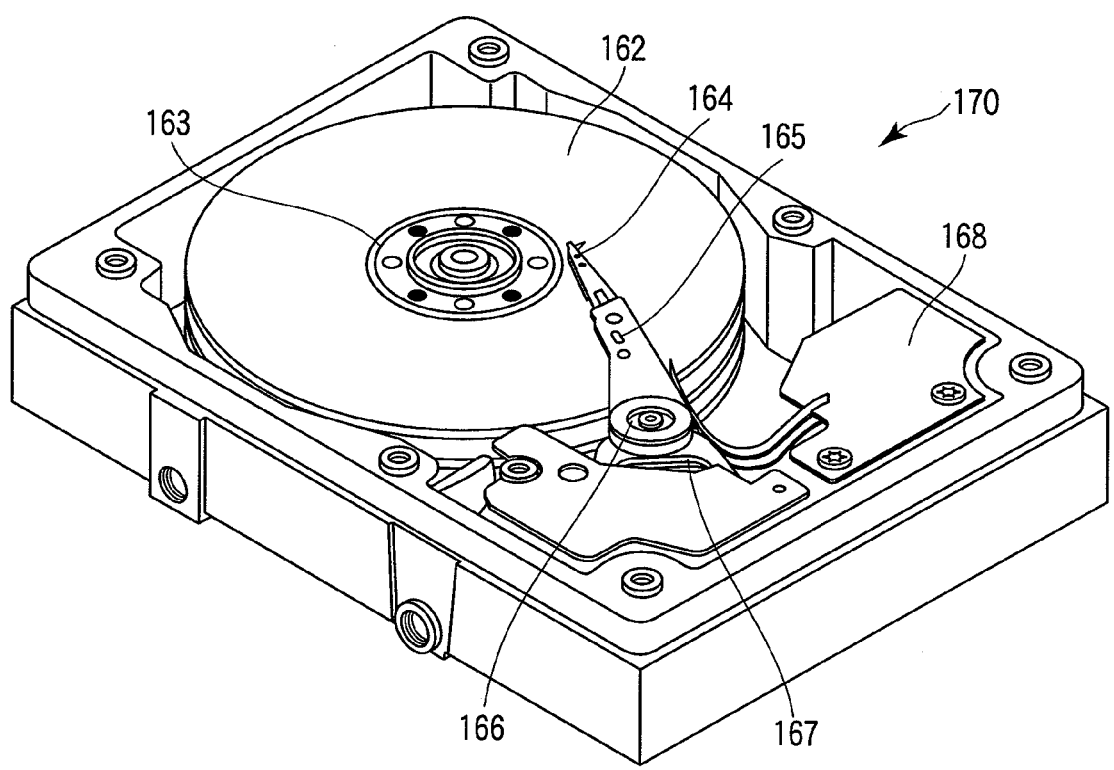
F I G. 16

MAGNETIC RECORDING MEDIUM

CROSS-REFERENCE TO RELATED APPLICATIONS

This application is based upon and claims the benefit of priority from Japanese Patent Application No. 2010-078861, filed Mar. 30, 2010; the entire contents of which are incorporated herein by reference.

FIELD

Embodiments described herein relate generally to a magnetic recording medium, a method of manufacturing the same, and a magnetic recording apparatus including the magnetic recording medium.

BACKGROUND

Recently, the interference between adjacent bits poses a problem when increasing the recording density of a magnetic recording medium of a hard disk drive. A bit patterned medium physically divided in the bit direction has been proposed as a high-density magnetic recording medium capable of suppressing a thermal decay phenomenon by which recording marks disappear at room temperature, and suppressing medium noise from adjacent marks.

As the process of manufacturing the bit patterned medium, the development of a nanoimprinting method that duplicates a large amount of patterns has been advanced in order to inexpensively mass-produce media. Therefore, the technique of manufacturing a master as the start point of the duplication is the key. However, the bit patterned medium is expected as a high-density magnetic recording medium exceeding 2 Tbpsi (2 Terabit pitch per square inches), and the magnetic material dot period of one bit is 20 nm or less. Accordingly, the medium requires ultrafine patterns that are hardly formed by the photolithography technique having been developed for use in the semiconductor field or for the development of an optical disk master. Recently, a bit patterned medium master has been developed by using electron-beam lithography. Unfortunately, electron-beam lithography has the serious problems, i.e., the throughput is low, and the resolution decreases due to the proximity effect or the like.

Self-organization lithography using a diblock copolymer is a method capable of inexpensively forming fine patterns of a few nm to a few ten nm by using a micro phase separation structure (e.g., a lamellar structure, cylinder structure, or sphere structure). An imprinting master can be manufactured by etching a substrate by using a fine pattern having this self-organizing structure as a mask. However, to manufacture a bit patterned medium master by using self-organizing lithography, patterning must be performed using a layout that enables recording and reproduction in a hard disk drive.

As a method of forming a self-organizing structure in a necessary region of the medium surface, a method of preforming a desired physical guide groove and forming a dot as a micro phase separation structure in the groove has been proposed. When forming a concentric groove structure on a medium, forming a sphere-phase, self-organizing structure in this guide groove, and transferring a pattern onto a substrate, the sphere portion is transferred as a dot corresponding to one bit, and this makes it possible to manufacture a master for a data area of the bit patterned medium. In the guide groove, the dot array takes a hexagonal close-packed structure. On the other hand, to allow this bit patterned medium to function as a magnetic recording medium, it is necessary to form a pattern that forms not only a recording area but also a servo signal area in which information of the relative position of a recording/reproduction head and the track central position, track data information, and sector data information are embedded. The servo area includes a preamble portion for generating a sync signal, an address portion containing sector information and cylinder information, and a burst portion for obtaining a positioning signal. This servo area requires not a simple linear groove but a shape area corresponding to each signal characteristic, and hence is hardly formed by a regular self-organizing pattern. In addition, the servo area does not simply extend in the radial direction from the disk center, but is formed along the locus of a swing arm of a head.

The preamble portion is an essential area for obtaining a sync signal for signal recording and reproduction. If the signal quality of this area is low, it is impossible to input a reproduction signal to a PLL (Phase Locked Loop) and generate a reproduction clock signal. The address portion is an essential area for obtaining, e.g., the cylinder number of the data area. If the signal quality of this area is low, it is impossible to find (seek) a desired data area during recording/reproduction. In the present hard disk magnetic recording medium, a magnetic layer is formed on a flat disk substrate such as glass, and a continuous magnetic material mark is formed as a servo signal mark from the inner circumference to the outer circumference by using a servo writer apparatus or the like. The width of this servo signal mark in the disk circumferential direction continuously increases from the inner circumference toward the outer circumference, because the hard disk drive uses the CAV (Constant Angular Velocity) method in which the rotational angular velocity is constant during mark recording/reproduction. The bit patterned medium can be manufactured by forming the above-described servo signal pattern as a three-dimensional shape on an imprinting master, and transferring the pattern onto the medium. When manufacturing the bit patterned medium by self-organizing lithography, therefore, the servo portion must be formed by using a self-organizing pattern in the same manner as for the data portion. Accordingly, the servo signal area pattern must be formed by preforming a guide groove in a prospective servo signal pattern area of the present continuous magnetic recording film medium, and forming a self-organizing pattern in the groove. The preamble portion and address portion can be formed by forming a guide groove in an area extending from the inner circumference to the outer circumference, and transferring a pattern formed in the guide groove onto the medium by the nanoimprinting method. Since, however, the groove width changes from the inner circumferential side to the outer circumferential side, an area in which the number of self-organizing dot rows discontinuously changes forms, and this makes it very difficult to uniformly fill the dots. A magnetic medium manufactured using this master has the problem that there is a portion where a large defect occurs depending on the radial position, and the signal quality degrades and makes recording/reproduction difficult in the preamble area. Also, the magnetic material area (the filling ratio) is smaller (lower) than that of the continuous film medium. If there is a defective portion, therefore, the signal amplitude largely decreases and makes recording/reproduction difficult.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIGS. 10A, 10B, 10C, 10D, 10E and 10F are sectional views showing guide imprinting stamper manufacturing steps;

FIG. 12 is an exemplary view for explaining an example of an SEM observation image;

FIG. 13 is a graph plotting the relationship between the groove width and the number of rows;

FIGS. 14A, 14B, 14C, 14D, 14E, 14F, 14G, 14H, 14I, 14J, and 14K are views for explaining a method of manufacturing a master having self-organizing dot patterns;

FIG. 16 is a partially exploded perspective view showing an example of the magnetic recording/reproduction apparatus according to the embodiment.

DETAILED DESCRIPTION

Figure 1:
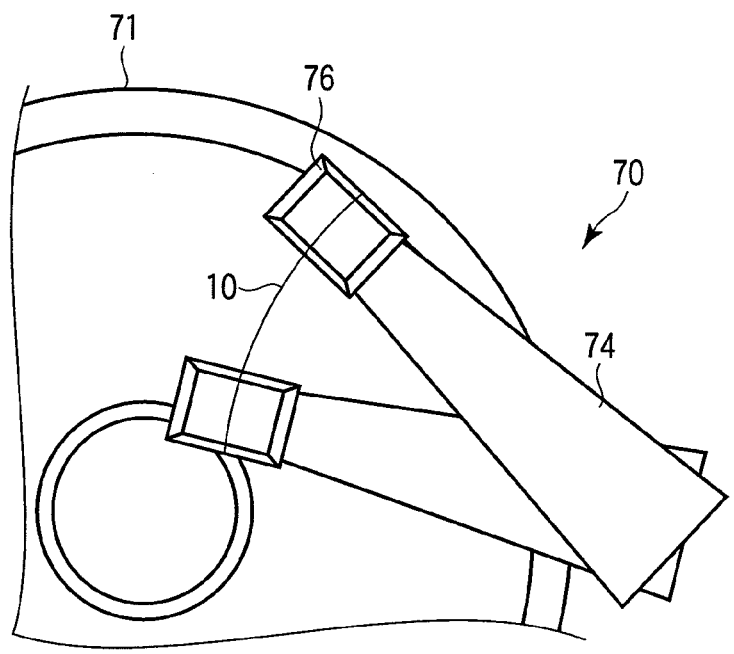
FIG. 1 is an exemplary view for explaining a magnetic recording medium and reproduction head to be used in a magnetic recording/reproduction apparatus according to an embodiment.

Various embodiments will be described hereinafter with reference to the accompanying drawings.

In general, according to one embodiment, there is provided a disk-like magnetic recording medium which is applied to a magnetic recording/reproduction apparatus including a reproduction head attached to a pivotal actuator arm, and includes a servo area formed along an arc corresponding to a locus when the reproduction head moves on the magnetic recording medium in a cross track direction, characterized in that the servo area includes magnetic dots arrayed at a period $L_0$, the magnetic dots include a plurality of magnetic dot regions divided in the cross track direction for the respective magnetic dots whose dot rows in at least a down track direction are common, and a width Wm in the down track direction of an mth magnetic dot region from an innermost circumference of the magnetic recording medium, among the plurality of magnetic dot regions, and a number Nm of dot rows in the down track direction of the mth region meet a relationship represented by $$L0\{Nm\sqrt{3}/2-0.3\} \leq Wm \leq L0\{Nm\sqrt{3}/2+0.3\} \quad (1)$$

Each magnetic dot region used in the embodiment is obtained by dividing magnetic dots in the cross track direction. The width of the magnetic dot region is defined within the range of $\pm 0.3 \times L_0$ of an integral multiple of $L_0 \times \sqrt{3}/2$ in the track direction. In the magnetic dot regions, therefore, dot rows in at least the down track direction are common.

The magnetic dots form at least one of, e.g., a preamble portion, address portion, and burst portion. At least the preamble portion can be formed by the magnetic dots.

A magnetic recording apparatus according to another aspect includes the above-mentioned magnetic recording medium, and a reproduction head attached to an actuator arm and movable on the magnetic recording medium in the radial direction.

A method according to still another aspect is a method of manufacturing the above-mentioned magnetic recording medium, characterized by including the steps of forming a first stamper including a projecting pattern corresponding to the plurality of regions, transferring the projecting pattern of the first stamper onto a resist layer formed on a substrate by imprinting, forming a guide by curing the resist, causing phase separation by applying a self-organizing material into the guide, forming a self-organizing dot pattern corresponding to magnetic dots arrayed at a period $L_0$, and forming a second stamper based on the self-organizing dot pattern, and preparing a magnetic recording medium including a substrate and a magnetic recording layer formed on the substrate, forming a pattern transfer resist material coating layer on the magnetic recording layer, adhering a pattern surface of the second stamper by using the coating layer, curing the coating layer, removing the second stamper to form, on the magnetic recording layer, a resist material layer cured after the self-organizing dot pattern is transferred, and performing dry etching by using the cured resist material layer as a mask, thereby forming the magnetic dots on a surface of the magnetic recording layer.

When using the magnetic recording medium according to an embodiment, an ordered magnetic dot array can be formed in a servo portion from a stamper manufactured by using a self-organizing material. This makes it possible to improve the signal quality of the servo area and suppress errors of a recording/reproduction mechanism.

The embodiments will be explained in more detail below with reference to the accompanying drawings.

FIG. 1 is a view for explaining a magnetic recording medium and reproduction head for use in a magnetic recording/reproduction apparatus according to an embodiment.

As shown in FIG. 1, a magnetic recording/reproduction apparatus 70 according to the embodiment includes a magnetic recording medium 71, and a reproduction head attached to an actuator arm 74 and movable on the magnetic recording medium 71 in the cross track direction. The actuator arm 74 is driven by a voice coil motor, and pivots around a pivot axis (not shown). Therefore, a reproduction head 76 incorporated into a head slider supported by a suspension at the distal end of the actuator arm moves to form an arcuate locus 10 on the magnetic recording medium 71.

Figure 2:
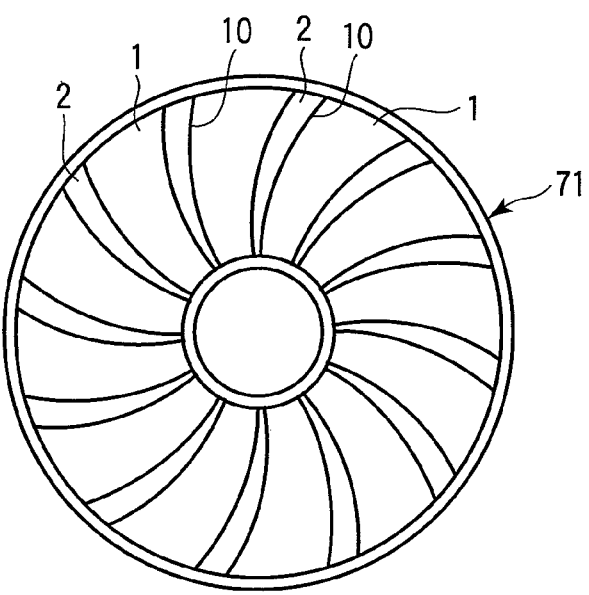
FIG. 2 is an exemplary view for explaining an example of a magnetic recording medium according to the embodiment.

FIG. 2 is a view for explaining an example of the magnetic recording medium according to the embodiment.

As shown in FIG. 2, the magnetic recording medium 71 has a servo area 2 formed along the above-mentioned locus 10. On the magnetic recording medium 71, a plurality of servo areas 2 are formed along a plurality of loci 10 formed at predetermined intervals, and data areas 1 are formed between the servo areas 2.

Note that each servo area 2 is formed along one side of the locus 10 in FIG. 2, but the servo area 2 can also be formed on each of the two sides of each locus 10, or formed between two loci spaced apart at a predetermined interval.

Figure 3:
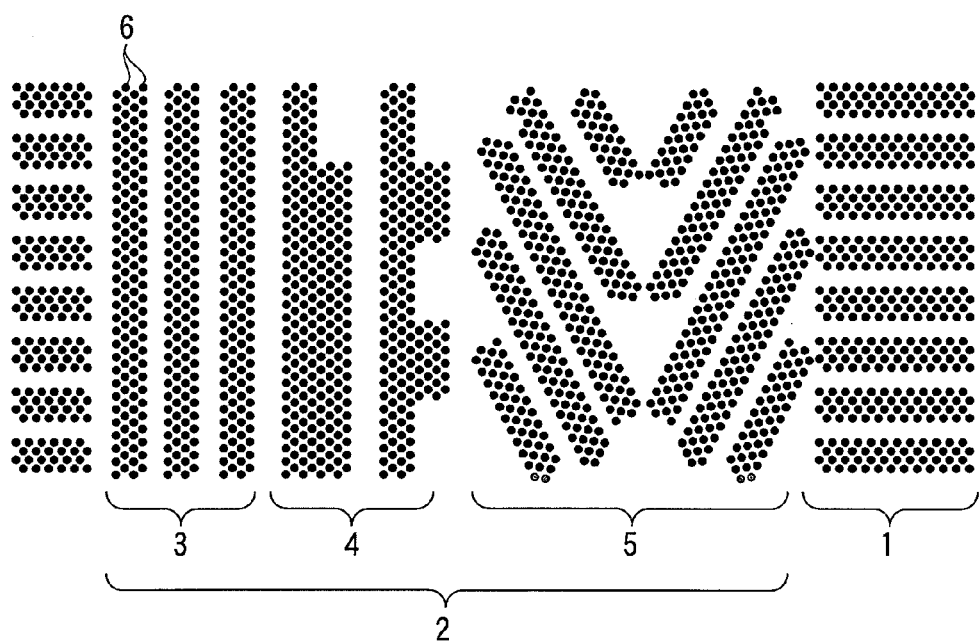
FIG. 3 is a model view for explaining a part of the magnetic recording medium according to the embodiment.

FIG. 3 is a model view for explaining a part of the magnetic recording medium according to the embodiment.

As shown in FIG. 3, the data area 1 and servo area 2 are formed by magnetic material dots having a pitch $L_0$. In the data area 1, a plurality of recording tracks each including rows of magnetic material dots 6 arrayed at the pitch $L_0$ along the down track direction, i.e., the direction parallel to the track locus are formed in the cross track direction, i.e., the direction crossing the tracks from the inner circumference to the outer circumference of the magnetic recording medium. In a preamble 3 and address 4 of the servo area 2, a plurality of rows of the magnetic material dots 6 arrayed at the pitch $L_0$ in the cross track direction are formed at equal intervals in the down track direction. A burst 5 is a positioning burst pattern of the phase difference detection method. In the burst 5, a plurality of rows of the magnetic material dots 6 arrayed at the pitch $L_0$ in the long-axis direction of the pattern are formed parallel to each other to make a specific angle with the down track direction. The burst portion 5 may also be a positioning burst pattern of the amplitude detection method.

The rows of the magnetic dots 6 in the preamble 3 of the magnetic recording medium are arrayed along a curve (arc) corresponding to the locus of the reproduction head shown in FIG. 1. Also, the rotational speed of the above-mentioned magnetic recording medium is constant, so the rotational speed of the magnetic recording medium immediately below the head increases from the inner circumference to the outer circumference. The read frequency band of the reproduction head remains unchanged. Therefore, although the rows of the magnetic dots 6 are linearly drawn in FIG. 3, the detection width of one bit actually increases toward the outer circumference. For this reason, the width of the preamble 3 in the circumferential direction increases toward the outer circumference.

Figure 4:
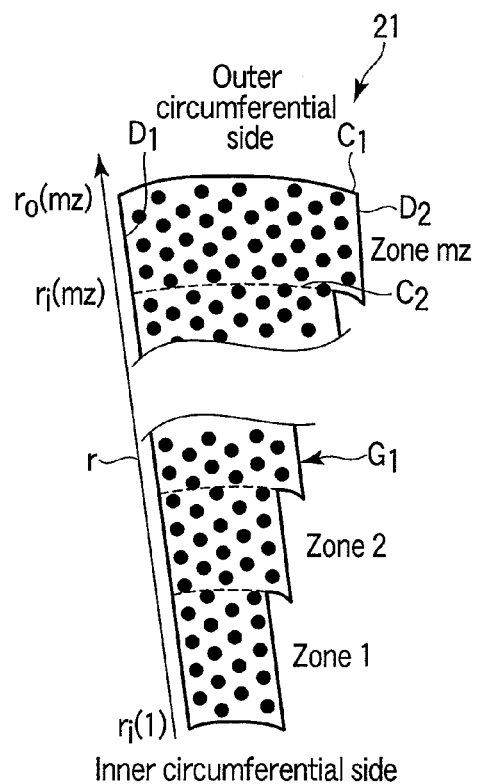
FIG. 4 is an exemplary view showing an aspect of the array of magnetic dot regions in a preamble portion of a servo area of the magnetic recording medium according to the embodiment.

FIG. 4 is a view showing an aspect of the array of magnetic dot regions in the preamble portion of the servo area of the magnetic recording medium according to the embodiment.

As shown in FIG. 4, a preamble portion 21 used in the magnetic recording medium according to the embodiment is divided into $m_z$ magnetic dot regions Zone 1, Zone 2, ..., Zone $m_z$ from the inner circumferential side of the magnetic recording medium in the cross track direction indicated by an arrow r.

A width Wm of each magnetic dot region in the down track direction and a number Nm of dot rows in the down track direction meet the relationship represented by expression (1) presented earlier.

For example, the $m_z$th magnetic dot region Zone $m_z$ from the inner circumferential side is surrounded by a straight line $D_1$ in the cross track direction indicated by the arrow r, another straight line $D_2$ formed parallel to the straight line $D_1$, and arcuate curves $C_1$ and $C_2$ on two different concentric circles smaller than the magnetic recording medium. The straight line $D_1$, curve $C_1$, straight line $D_2$, and curve $C_2$ each intersect two adjacent lines at intersections, and do not intersect the opposite line. In the preamble portion 21, the number of dot rows in the cross track direction and that in the down track direction are constant in each magnetic dot region, and a number $Nm_z$ of dot rows in the $m_z$th magnetic dot region is constant on the straight line $D_1$ side and increases by one on the straight line $D_2$ side, when compared to a number $Nm_z$−1 of dot rows in the ($m_z$−1)th magnetic dot region: the width on the straight line $D_2$ side increases in the form of a staircase from the inner circumferential side to the outer circumferential side.

Figure 5:
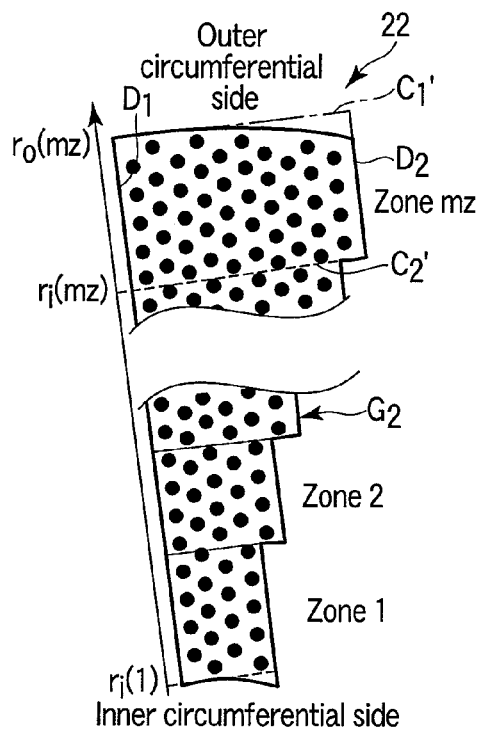
FIG. 5 is an exemplary view showing another aspect of the array of the magnetic dot regions in the preamble portion of the servo area of the magnetic recording medium according to the embodiment.

FIG. 5 is a view showing another aspect of the array of the magnetic dot regions in the preamble portion of the servo area of the magnetic recording medium according to the embodiment.

A preamble portion 22 has the same arrangement as that shown in FIG. 4 except that, for example, the $m_z$th magnetic dot region Zone $m_z$ is surrounded by a quadrilateral made up of a straight line $D_1$ in the cross track direction indicated by the arrow r, another straight line $D_2$ formed parallel to the straight line $D_1$, and two parallel straight lines $C_1'$ and $C_2'$ intersecting the straight lines $D_1$ and $D_2$.

As indicated by $G_1$ and $G_2$ in FIGS. 4 and 5, a shape represented by lines surrounding the whole magnetic dot region forming one preamble portion by combining the shapes surrounding the individual magnetic dot regions can be regarded as the shape of a guide for applying a self-organizing material.

Note that in FIGS. 4 and 5, of the lines $G_1$ and $G_2$ surrounding the magnetic dot regions, only one line formed along the cross track direction has the shape of a staircase. However, it is also possible to give the shape of a staircase to the both sides, and space the magnetic dot regions apart from each other.

Note also that the address portion and burst portion of the servo area used in the embodiment can be formed by magnetic dots divided into magnetic dot regions, like the preamble portion described above.

Figure 6:
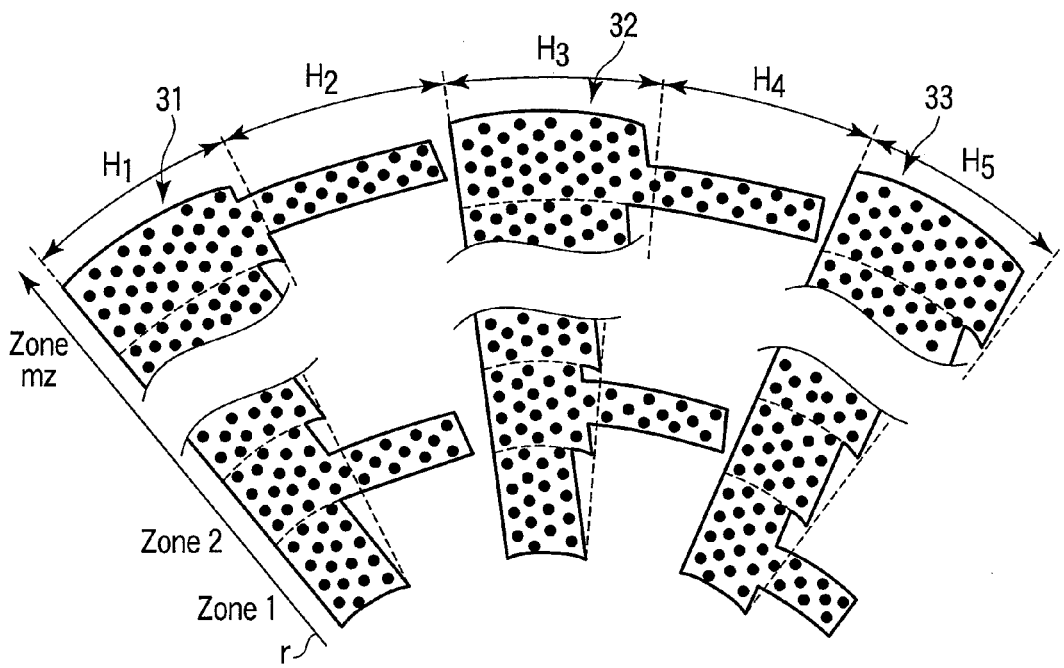
FIG. 6 is an exemplary view showing an aspect of the array of magnetic dot regions in an address portion of the servo area of the magnetic recording medium according to the embodiment.

FIG. 6 is a view showing an aspect of the array of magnetic dot regions in the address portion of the servo area of the magnetic recording medium according to the embodiment.

As shown in FIG. 6, the magnetic dot regions in address portions 31, 32, and 33 include magnetic dots arrayed at the period $L_0$, the magnetic dots include a plurality of magnetic dot regions Zone 1, Zone 2, ..., Zone $m_z$ divided along the cross track direction indicated by the arrow r, and among the $m_z$ magnetic dot regions, the width Wm in the down track direction of the mth magnetic dot region from the innermost circumference of the magnetic recording medium and the number Nm of dot rows in the down track direction of the mth region meet the relationship represented by expression (1) presented earlier.

The shapes of the address portions 31, 32, and 33, e.g., magnetic dots in regions $H_1$, $H_3$, and $H_5$ are partially similar to those of the preamble portion shown in FIG. 4 in width of magnetic dots, number of dot rows, and shape. Accordingly, it is possible to regard the magnetic dots forming the preamble portion as reference dots, and form the address portion by combining the reference dots.

Likewise, the burst portion (not shown) is partially similar to the preamble portion in width of magnetic dots and number of dot rows. This makes it possible to regard the magnetic dots forming the preamble portion as reference dots, and form the burst portion by combining the reference dots.

Figure 7:
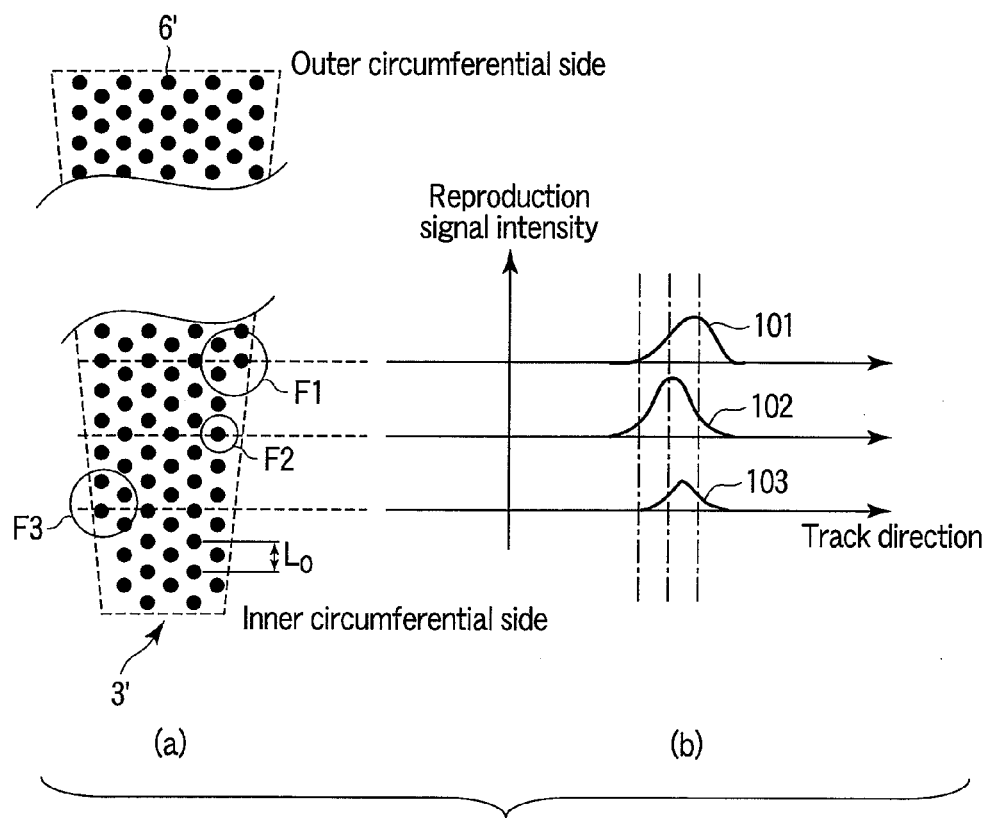
FIG. 7 is an exemplary view for explaining a comparative magnetic recording medium.

For reference, FIGS. 7(a) and 7(b) are views for explaining a magnetic recording medium including, in a servo area, a preamble portion in which magnetic dots are not divided into magnetic dot regions.

As shown in FIG. 7(a), rows of magnetic material dots 6' of a preamble 3' of a comparative magnetic recording medium obtained by self-organizing lithography are not divided into magnetic dot regions, so the width in the down track direction continuously changes. As indicated by defective regions F1 and F3, for example, a dot defect or pitch shift occurs in a portion where the number Nm of dot rows changes with the change in width in the down track direction. If an array defect like this occurs, as shown in FIG. 7(b), the peak position of a reproduction signal in each of the defective regions F1 and F3 deviates from the window region of a clock, or the signal waveform is distorted, and an error occurs. As a consequence, the SNR decreases. Neither distortion nor deviation is found in the waveform of a region F2 of a track in which the number Nm of dot rows remains unchanged.

Figure 8:
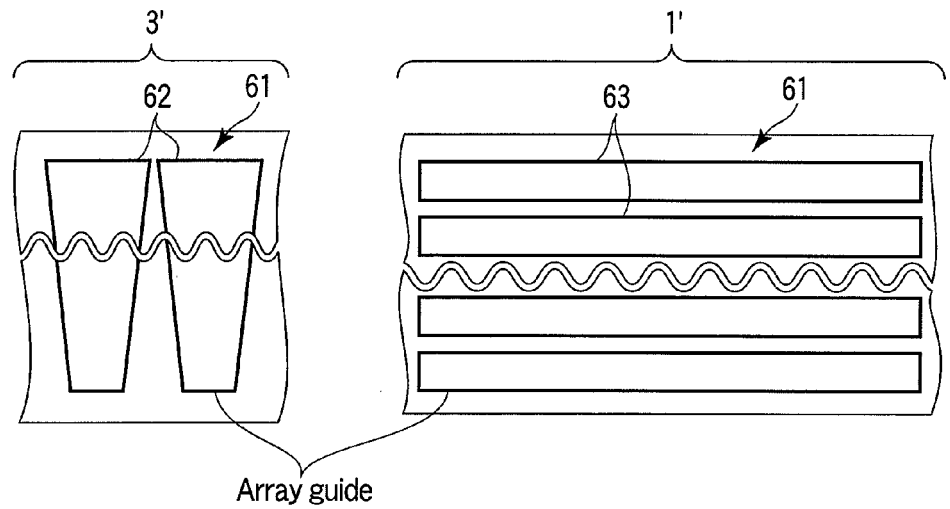
FIG. 8 is an exemplary view showing guides for forming magnetic dots shown in FIGS. 7(*a*) and 7(*b*) by using a self-organizing material.

FIG. 8 is a view showing guides for forming the magnetic dots shown in FIGS. 7(a) and 7(b) by using a self-organizing material.

For example, a stamper base on which an insulating layer 61 is formed is prepared, and grooves 62 for guiding the self-organizing material are formed in the insulating layer 61 by lithography. Since the preamble 3' has the shape that continuously increases the groove width, the grooves each having a shape that continuously increases the groove width toward the outer circumference are formed along the cross track direction at equal intervals. In a data area 1', grooves 63 corresponding to recording tracks along the down track direction are formed at equal intervals.

Figure 9:
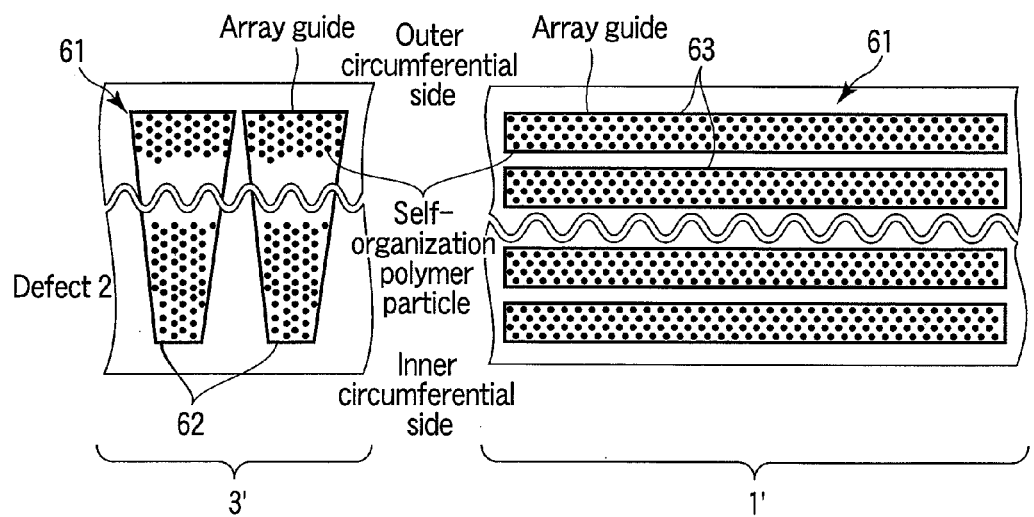
FIG. 9 is an exemplary view for explaining the way the magnetic dots are formed by applying the self-organizing material to the guides shown in FIG. 8.

FIG. 9 is a view for explaining the way magnetic dots are formed by applying the self-organizing material to the guides shown in FIG. 8.

As shown in FIG. 9, phase separation is caused by filling a block copolymer in the grooves 62 and 63 formed as described above. Consequently, in the direction of the grooves, dot-like polymer particles are arrayed at the pitch $L_0$ in the down track direction. In the preamble 3' of the servo area, dot-like polymer particles are arranged at the pitch $L_0$ in the cross track direction.

A three-dimensional dot pattern can be formed by etching a substrate by using the polymer particles thus formed as mask templates. Accordingly, it is possible to manufacture an imprinting master for manufacturing the magnetic recording medium according to the embodiment.

Magnetic material dots can be formed by forming a magnetic layer and insulating layer on a substrate, transferring a three-dimensional dot pattern onto the insulating layer by using the above-mentioned master in a nanoimprinting step, and etching the magnetic layer by using the projecting dot pattern of the insulating layer as a mask. Magnetic material dots can also be formed by forming a magnetic layer and insulating layer on a substrate, and etching the magnetic layer by using polymer particles as mask templates in a similar step.

When magnetic dots are formed by the above method, the groove shape largely affects the arrayed state of the magnetic dots and that of the polymer particles. Since the grooves in the data area 1 are concentric, the groove width is constant and has no large effect on the array. On the other hand, in the preamble 3' of the servo area, the width in the circumferential direction increases from the inner circumferential side to the outer circumferential side as described previously. This change in groove width largely affects the dot array. As shown in FIG. 7(a), array defects of magnetic dots are observed if array guides are formed to have a shape that continuously increases the groove width as written in the existing continuous film.

To optimize the relationship between the groove width and dot array, therefore, grooves having a few different widths were formed, and experiments were conducted to investigate the arrayed statuses of self-organizing particles in the grooves.

(Experiments for Verification of Guide Width and Number of Dot Rows)

Investigation of Self-organization Dot Pitch

As a self-organizing material to be filled in grooves, polystyrene-polydimethylsiloxane (PS-PDMS) as a kind of a diblock copolymer was prepared.

First, an experiment was conducted on a flat wafer with no guide in order to check the periodic length of a self-organizing structure. PS-PDMS (to be referred to as PS-PDMS #1 hereinafter) in which a number average molecular weight Mn of PS was 11,700, that of PDMS was 2,900, and the molecular weight dispersion was 1.07 was adjusted to 0.30 wt % by a toluene solvent, and a 3-inch wafer with no guide was spin-coated with the solution, thereby obtaining a 20-nm thick PS-PDMS film. The substrate was annealed in a vacuum at 180° C. for 12 hrs. Then, oxygen plasma etching was performed by an ICP (Inductively Coupled Plasma) etching apparatus, and the surface shape was observed with an SEM. Consequently, a dot periodic structure having a pitch of 17 nm was observed.

Formation of Guides

FIGS. 10A, 10B, 10C, 10E, and 10F are sectional views showing guide imprinting stamper manufacturing steps.

Electron-beam resist ZEP520A (ZEON) was diluted to twice the volume with anisole, the solution was filtered with a 0.2-μm membrane filter, and a silicon wafer 51 having a diameter of 8 inches was spin-coated with the solution. Immediately after that, the substrate was prebaked at 200° C. for 3 min, thereby obtaining a 0.5-μm thick resist layer 52, as shown in FIG. 10A. As shown in FIG. 10B, an electron-beam lithography apparatus having an acceleration voltage of 50 kV and a beam diameter of 20 nm was used to write patterns 53 corresponding to grooves by changing the linear velocity condition at a track pitch of 200 nm. After that, the wafer was rinsed as it was dipped in a rinsing solution for 90 sec (ZMD-B (available from ZEON)), and dried by air blow, thereby obtaining a resist master 54 having resist patterns 52' corresponding to grooves, as shown in FIG. 10C. In this embodiment, resist patterns corresponding to twelve different groove widths, i.e., 45, 50, 53, 55, 58, 63, 65, 72, 79, 80, 84, and 90 nm, as shown in Table 1 below.

Subsequently, as shown in FIG. 10D, a thin conductive film 55 was formed on the resist master 54 by sputtering. That is, in a chamber evacuated to $8 \times 10^{-3}$ Pa and then adjusted to 1 Pa by supplying argon gas, sputtering was performed for 20 sec by using pure nickel as a target and applying a DC power of 400 W, thereby obtaining a 15-nm conductive film.

After that, the resist master having the conductive film formed on it was electroformed for 90 min by using a nickel sulfamate plating solution (NS-160 available from Showa Chemical), thereby forming an electroformed film 56, as shown in FIG. 10E. The electroforming bath conditions were as follows.

Nickel sulfamate: 600 g/L
Boric acid: 40 g/L
Surfactant (sodium lauryl sulfate): 0.15 g/L Solution temperature: 55° C.
pH: 4.0
Current density: 20 A/dm$^2$ The thickness of the obtained electroformed film was 300 μm.

Then, as shown in FIG. 10E, a stamper 57 including the conductive film 55, electroformed film 56, and resist residue (not shown) was released from the resist master 54. Subsequently, as shown in FIG. 10F, the resist residue was removed by oxygen plasma ashing. This oxygen plasma ashing was performed at 100 W for 20 min in a chamber adjusted to a vacuum degree of 4 Pa by supplying oxygen gas at 100 mL/min. In this manner, a father stamper 57' including the conductive film and electroformed film was obtained. After that, a guide imprinting stamper was manufactured by punching unnecessary portions of the obtained stamper by using a metal blade.

The stamper was ultrasonically cleaned with acetone for 15 min, and dipped in a solution prepared by diluting fluoroalkylsilane ($CF_3(CF_2)_7CH_2CH_2Si(OCH_3)_3$) (TSL8233 available from GE Toshiba Silicones) to 5% with ethanol, in order to increase the releasability during imprinting. After the solution was blown off by a blower, the stamper was annealed at 120° C. for 1 hr.

FIGS. 11A, 11B, 11C, 11D, 11E, and 11F are sectional views showing self-organizing dot pattern manufacturing steps.

Figure 11A:
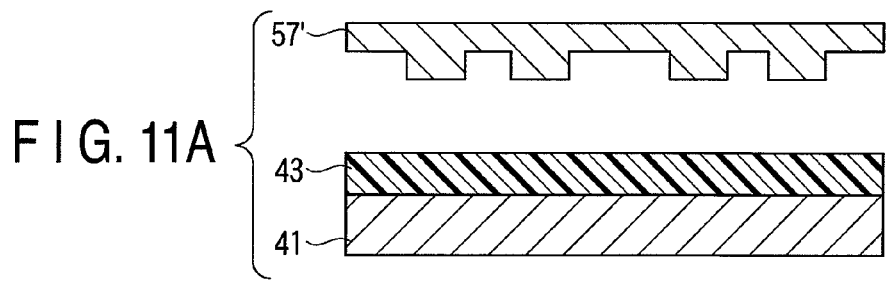
FIGS. 11A, 11B, 11C, 11D, 11E, and 11F are sectional views showing self-organizing dot pattern manufacturing steps.
Figure 11B:
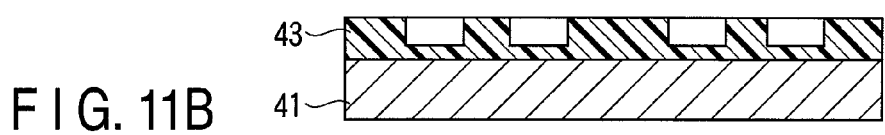
Figure 11C:
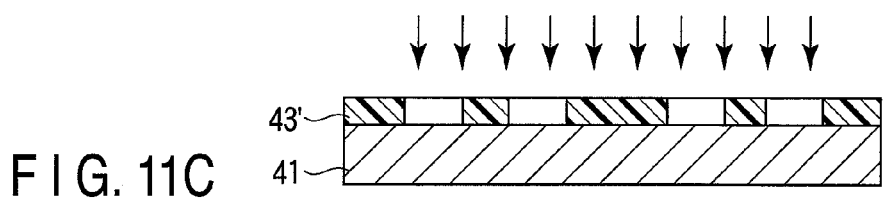

As shown in FIG. 11A, an Si substrate 41 was spin-coated with a novolak-based resist (S1801 available from Rohm and Haas), as an imprinting resist, at a rotational speed of 3,800 rpm, thereby forming a resist film 43. After that, as shown in FIG. 11B, the above-described stamper was aligned with the substrate 41 to be processed, and the stamper 57' was pressed at 2,000 bar for 1 min, thereby transferring patterns onto the resist film 43. The resist film 43 having the transferred patterns was irradiated with UV (ultraviolet) light for 5 min, and cured as it was heated at 160° C. for 30 min. Then, as shown in FIG. 11C, an ICP (Inductively Coupled Plasma) etching apparatus was used to perform oxygen RIE on the resist film 43 at an etching pressure of 2 mTorr until the substrate 41 was exposed, thereby forming, on the substrate 41, resist patterns 43' for defining grooves serving as self-organizing dot pattern guides. When the groove widths were observed with an SEM, twelve different groove widths (45, 50, 53, 55, 58, 63, 65, 72, 79, 80, 84, and 90 nm) as shown in Table 1 were formed.

Figure 11D:
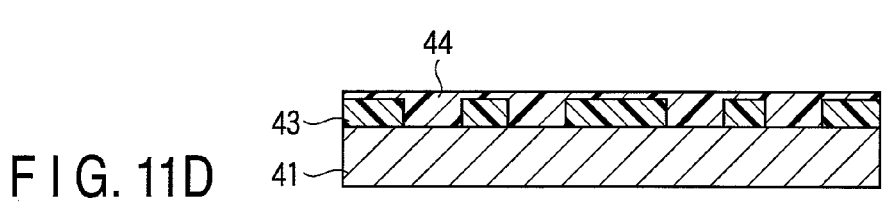
Figure 11E:
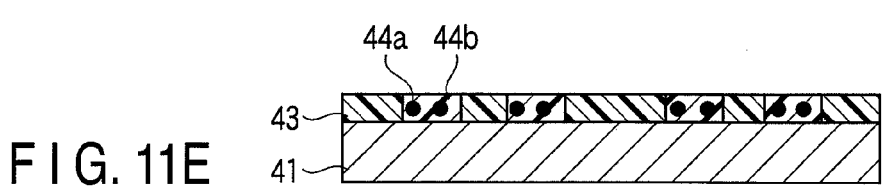
Figure 11F:
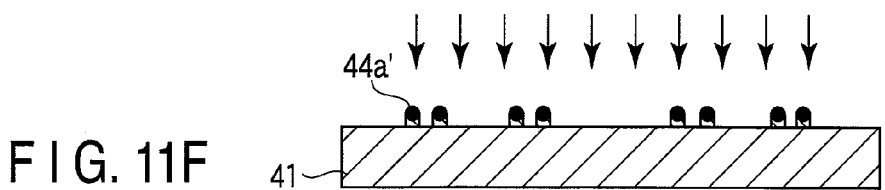

Subsequently, as shown in FIG. 11D, the substrate 41 including the resist patterns 43' was spin-coated with a 0.30-wt % toluene solution of PS-PDMS #1 described previously. As shown in FIG. 11E, PS-PDMS was separated into an island-like polydimethylsiloxane phase 44a and sea-like polystyrene phase 44b by performing annealing at 180° C. for 24 hrs, thereby forming a self-organizing structure in the grooves. In addition, as shown in FIG. 11F, the sea-like polystyrene phase 44b was removed by performing oxygen plasma etching by using the ICP (Inductively Coupled Plasma) etching apparatus, thereby obtaining self-organizing dot patterns 44a. The obtained self-organizing dot patterns 44a were observed with the SEM.

In the SEM observation image, it was possible to confirm a minimum of three rows and a maximum of six rows, as shown in Table 1 below.

FIG. 12 is a view for explaining an example of the SEM observation image.

In the grooves, as shown in FIG. 12, the polymer particles 44a were arrayed at a dot pitch $L_0$ of 17 nm along the guides. In this embodiment, a row of polymer particles arrayed in the guide direction is counted as one row, as the number of rows.

TABLE 1

| No. | Groove width (nm) | Number of rows | Differences (three rows) between calculated groove width and experimental groove width (nm) | Differences (four rows) between calculated groove width and experimental groove width (nm) | Differences (five rows) between calculated groove width and experimental groove width (nm) | Differences (six rows) between the calculated groove width and experimental groove width (nm) |
|---|---|---|---|---|---|---|
| 1 | 45 | 3 | 0.8 | −13.9 | −28.6 | −43.3 |
| 2 | 50 | 3 | 5.8 | −8.9 | −23.6 | −38.3 |
| 3 | 53 | 3 | 8.8 | −5.9 | −20.6 | −35.3 |
| 4 | 55 | 4 | 10.8 | −3.9 | −18.6 | −33.3 |
| 5 | 58 | 4 | 13.8 | −0.9 | −15.6 | −30.3 |
| 6 | 63 | 4 | 18.8 | 4.1 | −10.6 | −25.3 |
| 7 | 65 | 5 | 20.8 | 6.1 | −8.6 | −23.3 |
| 8 | 72 | 5 | 27.8 | 13.1 | −1.6 | −16.3 |
| 9 | 79 | 5 | 34.8 | 20.1 | 5.4 | −9.3 |
| 10 | 80 | 5 | 35.8 | 21.1 | 6.4 | −8.3 |
| 11 | 84 | 6 | 39.8 | 25.1 | 10.4 | −4.3 |
| 12 | 90 | 6 | 45.8 | 31.1 | 16.4 | 1.7 |

TABLE 2

| Number of rows | 3 | 4 | 5 | 6 |
|---|---|---|---|---|
| Groove width (nm) | 44.2 | 58.9 | 73.6 | 88.3 |

When n rows exist with respect to the dot pitch $L_0$ as shown in FIG. 12, a groove width Wg is presumably desirably close to a value represented by $$Wg = n \times L0 \times \sqrt{3}/2 \qquad (2)$$

When the dot pitch $L_0$ is 17 nm, as shown in Table 2, the groove width Wg is 44.2 nm for three rows, 58.9 nm for four rows, 73.6 nm for five rows, and 88.3 nm for six rows. Therefore, Table 1 shows the differences between the calculated values and experimental values as well.

FIG. 13 is a graph plotting the relationship between the groove width and the number of rows.

Referring to FIG. 13, ◊ indicates the experimental value, and ○ indicates the calculated value.

When the number of rows was three, the groove width could be larger than the calculated value by 0.8-8.8 nm, but the number of rows became four in groove 4 larger by 10.8 nm. When the number of rows was four, the number remained four within the range of −3.9 nm to +4.1 nm of the calculated value, but became five in groove 7 larger by 6.1 nm. When the number of rows was five, the number remained five within the range of −8.6 nm to +6.4 nm of the calculated value, but became six in groove 11 larger by 10.4 nm. When the number of rows was six, the number remained six if the groove width was the calculated value—4.5 nm, but did not remain six if the groove width was the calculated value—8.3 nm. The above results demonstrate that when the number of rows is three to six, the predetermined number of rows can be formed and a defect hardly occurs if the groove width is set within the range of −5 nm to +6 nm of the calculated value. Since this range is about 30% of a dot pitch of 17 nm, the number of rows meeting a designed value can be formed with a margin by setting the groove width within the range represented by $$n \times L0 \times \sqrt{3}/2 - 0.3 \times L0 < Wg < n \times L0 \times \sqrt{3}/2 + 0.3 \times L0 \quad (3)$$

In the embodiment, the imprinting guides for the magnetic recording medium can be designed by using the groove width Wg described above.

The embodiment will be explained in more detail below by way of its examples.

EXAMPLE 1

PS-PDMS 30-nm Pitch Dot Pattern

Polystyrene-polydimethylsiloxane (PS-PDMS) was used as a diblock copolymer species to be filled in grooves. First, an experiment was conducted on a flat wafer having no guide in order to check the periodic length of a self-organizing structure. PS-PDMS (PS-PDMS #2) in which the number average molecular weight Mn of PS was 30,000, that of PDMS was 7,500, and the molecular weight dispersion was 1.10 was adjusted to 0.50 wt % by a toluene solvent, and a 3-inch wafer with no guide was spin-coated with the solution, thereby obtaining a 30-nm thick PS-PDMS film. This substrate was annealed in a vacuum at 180° C. for 12 hrs. Then, oxygen plasma etching was performed in an ICP (Inductively Coupled Plasma) etching apparatus, and the surface shape was observed with an SEM. As a result, a dot periodic structure having a pitch of 30 nm was observed.

A method of forming a bit patterned medium servo area by using 30-nm pitch PS-PDMS #2 described above will be explained below.

First, a method of manufacturing a self-organizing guide nickel stamper will be explained.

A resist master as a preamble portion pattern for lithography was obtained by the same steps as shown in FIGS. 10A, 10B, 10C, and 10D, except that guide patterns which had the same arrangement as that shown in FIG. 4 and in which the number m/z of magnetic dot regions was four were used as patterns 53.

When the pitch was 30 nm, the value of expression (1) was calculated as shown in Table 3 below, and servo area guide patterns were formed to start with a 78-nm wide trapezoidal pattern for three rows of 30-nm pitch dots and end with the fourth 156-nm wide pattern for six rows. On the other hand, in a data area, concentric circles having a groove width of 104 nm were formed at a pitch of 200 nm. The pattern height of the resist master was 50 nm when observed with an atomic force microscope. Then, a guide imprinting Ni stamper having a conductive film was manufactured by electroplating by the same steps as shown in FIGS. 10E and 10F.

TABLE 3

| Number of rows | 3 | 4 | 5 | 6 |
|---|---|---|---|---|
| Groove width (nm) | 77.9 | 103.9 | 129.9 | 155.9 |

Next, a method of manufacturing a master having self-organizing dot patterns will be explained below with reference to FIGS. 14A, 14B, 14C, 14D, 14E, 14F, 14G, 14H, 14I, 14J, and 14K.

As shown in FIG. 14A, a room-temperate, high-pressure imprinting method was used to transfer patterns from the manufactured nickel stamper 57' onto the resist substrate 41. More specifically, S1818 as a positive resist was diluted to 10 times the volume, and a 100-nm thick resist layer 43 was formed on the Si substrate 41 by spin coating (rotational speed: 5,000 rpm). To perform pattern transfer in a post-process, a hard mask layer 42 was formed on the Si substrate 41 by stacking a 20-nm thick carbon layer and a 5-nm thick Si layer from the substrate side. The hard mask layer 42 was deposited in an argon ion sputtering apparatus. As shown in FIG. 14B, after the patterns were transferred onto the resist 43 by imprinting, the resist patterns 43 were cured by performing annealing in a clean oven at 200° C. for 1 hr. When observed with an AFM, the patterns had a height of 40 nm. As shown in FIG. 14C, an oxygen plasma etching apparatus was used to perform etching until the bottoms of pattern grooves reached the hard mask layer 42. This etching was performed at a pressure of 0.2 mTorr, an antenna power of 100 W, and a coil power of 100 W for 30 sec. When the arcuate groove on the inner circumferential side was measured with the AFM, the groove width in the circumferential direction was 78 nm. On the other hand, the width of the arcuate groove on the outer circumferential side was about 156 nm. The groove depth was 35 nm.

As shown in FIG. 14D, the substrate having the grooves formed as described above was coated with a solution 44 of aforementioned PS-PDMS #2. That is, the solution 44 was adjusted to 0.5 wt % by using toluene as a solvent, and the substrate was spin-coated with the solution 44 at 3,000 rpm. After that, annealing was performed in a vacuum at 180° C. for 24 hrs. Consequently, as shown in FIG. 14E, the phase of PS-PDMS was separated into island-like polydimethylsiloxane 44*a* and sea-like polystyrene 44*b*, thereby forming a self-organizing dot structure.

After the annealing process was complete, the surface PDMS layer was removed by performing processing using CF$_4$ at 0.5 mTorr, an antenna power of 50 W, and a bias power of 50 W for 10 sec. Subsequently, oxygen plasma etching was performed at 0.2 mTorr, an antenna power of 100 W, and a bias power of 100 W for 30 sec. When the obtained structure was observed with the AFM, as shown in FIG. 14E, 30-nm pitch, phase-separated dot patterns 44*a* were found in a data portion and servo portion. In a preamble portion, dots were found in a plurality of arcuate grooves, as shown in FIG. 4. In the innermost groove, three dot rows were formed in the radial direction as designed. In the second groove, five dot rows were formed in the radial direction. In the outermost large-diameter groove, the width in the circumferential direction was 156 nm, and six dot rows were formed in the radial direction. In every region, no spatial defect occurred, and an almost hexagonal array was formed. When the sample was observed with the AFM, the guide grooves disappeared, and only the dot projecting patterns 44*a* were observed. Then, as shown in FIG. 14F, the dot projecting patterns were used as masks to expose a 5-nm thick Si hard mask layer 42*b* of the hard mask layer 42 to CF$_4$ plasma etching at 0.2 Pa, an antenna power of 50 W, and a biascoil power of 50 W for 15 sec, thereby selectively removing the Si hard mask layer 42*b*.

After that, as shown in FIG. 14G, underlying 15-nm thick C hard masks 42a were etched by oxygen plasma etching at 0.2 Pa, an antenna power of 100 W, and a bias power of 100 W for 35 sec, thereby transferring the patterns onto the hard mask 42. Subsequently, as shown in FIG. 14H, Si of the substrate was etched by $CF_4$ plasma etching at 0.2 Pa, an antenna power of 100 W, and a biascoil power of 100 W for 30 sec. Finally, the C hard masks 42a were removed by performing oxygen plasma etching at 0.2 Pa, an antenna power of 100 W, and a biascoil power of 100 W for 40 sec, thereby manufacturing a silicon stamper master 41', as shown in FIG. 14I.

When the manufactured master was checked with the atomic force microscope, a structure in which groups having ordered dot arrays were arranged in the radial direction like the polymer patterns was observed.

As shown in FIG. 14J, a thin conductive film 45 was formed on the silicon stamper master 41' by sputtering in the same manner as in the step shown in FIG. 10D. That is, in a chamber evacuated to $8 \times 10^{-3}$ Pa and then adjusted to 0.5 Pa by supplying argon gas, sputtering was performed for 30 sec by using pure nickel as a target and applying a DC power of 100 W, thereby obtaining a 7-nm conductive film. Then, in the same manner as in the step shown in FIG. 10E, a guide imprinting Ni stamper 46 having the conductive film was manufactured by electroplating. The electroforming bath conditions were as follows.

Nickel sulfamate: 600 g/L
Boric acid: 40 g/L
Surfactant (sodium lauryl sulfate): 0.15 g/L
Solution temperature: 50° C.
pH: 4.0
Current density: 10 A/dm²

The thickness of the obtained electroformed film was 300 μm.

FIGS. 15A, 15B, 15C, 15D, 15E, 15F, and 15G are views showing steps of manufacturing the magnetic recording medium according to the embodiment.

Figure 15A:
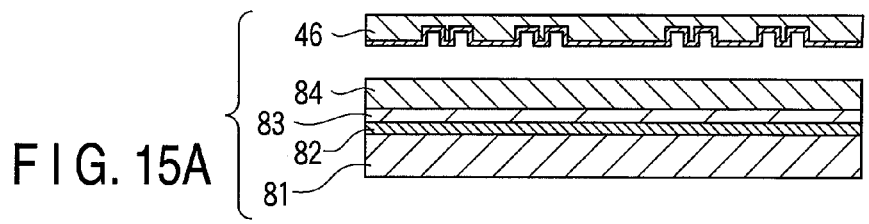
FIGS. 15A, 15B, 15C, 15D, 15E, 15F and 15G are views showing steps of manufacturing the magnetic recording medium according to the embodiment.
Figure 15B:
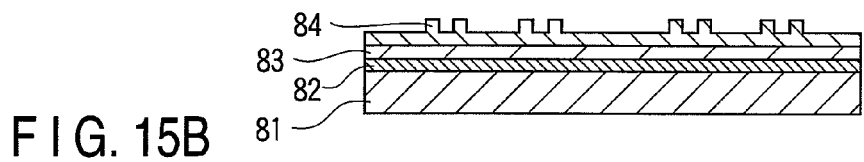
Figure 15C:
Figure 15D:
Figure 15E:
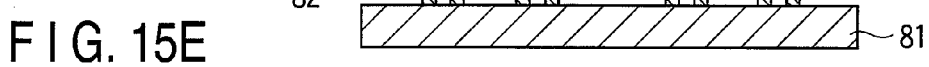

As shown in FIG. 15A, a substrate was prepared by forming, on a substrate 81 to be processed that was a 1.8-inch, doughnut-like glass substrate, a magnetic recording layer 82 for perpendicular recording and a hard mask layer 83 for pattern transfer from a resist mask to the magnetic recording layer, and a resist film 84 was formed by spin-coating the protective layer 83 with a novolak-based resist (S1801 available from Rohm and Haas) at a rotational speed of 3,800 rpm. The hard mask layer 83 had a structure obtained by stacking a 20-nm thick carbon layer and 5-nm thick Si layer from the substrate side. After that, the above-described stamper 46 was aligned with the substrate 81 to be processed. As shown in FIG. 15B, the stamper 46 was pressed at 2,000 bar for 1 min, thereby transferring the patterns onto the resist film 84. The resist film 84 having the transferred patterns was irradiated with UV (ultraviolet) light for 5 min, and heated at 160° C. for 30 min. Then, as shown in FIG. 15C, an ICP (Inductively Coupled Plasma) etching apparatus was used to perform oxygen RIE on the resist film of the substrate imprinted as described above, at an etching pressure of 2 mTorr, thereby forming resist patterns 84'. Subsequently, the resist patterns 84' were used as masks to form a dot-like hard mask layer 83' as follows. First, a dot-like Si hard mask was formed by etching the upper Si layer of the hard mask layer at 0.1 Pa, an antenna power of 50 W, and a bias power of 10 W for 30 sec. Then, this Si layer was used as a hard mask to remove the lower C layer by oxygen plasma etching at 0.1 Pa, an antenna power of 200 W, and a bias power of 5 W for 40 sec, thereby forming a dot-like C hard mask.

In addition, the dot-like hard mask layer 83' was used as a mask to etch the magnetic recording film 82 by using Ar ion milling, thereby forming an isolated dot-like magnetic recording layer 82'.

Figure 15F:
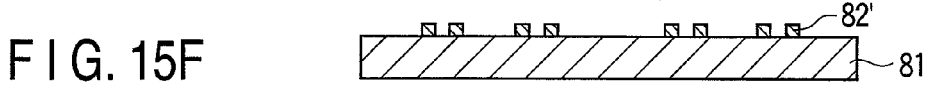

After that, as shown in FIG. 15F, oxygen RIE was performed at 400 W and 1 Torr in order to remove the dot-like hard mask layer 83' used as an etching mask.

Figure 15G:
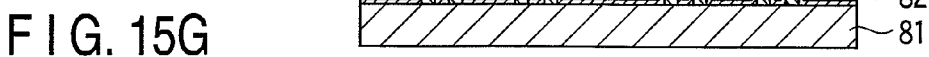

As shown in FIG. 15G, 3-nm thick DLC was deposited as a protective film 85 on the substrate 81 and magnetic recording layer 82' by CVD (Chemical Vapor Deposition).

Finally, a magnetic material processing type magnetic disk medium 162 was obtained by coating the protective film 85 with a 1-nm thick lubricant (not shown) by dipping. Note that it is also possible to deposit DLC as a protective film after the magnetic recording layer 82a is formed and a nonmagnetic material such as $SiO_2$ is buried in the grooves by sputtering or the like. This method is favorable in that it is possible to adjust the planarization of the surface shape so as to stabilize the floating of a head.

When the above-mentioned magnetic recording medium was evaluated by a spinstand, the SNR of the preamble portion in the radial direction was found to be almost 15 dB.

FIG. 16 is a partially exploded perspective view showing an example of a magnetic recording/reproduction apparatus including the magnetic recording medium described above.

In a magnetic recording/reproduction apparatus 170, a rigid information recording magnetic disk 162 according to the embodiment is attached to a spindle 163, and rotated at a predetermined rotational speed by a spindle motor (not shown). A slider 164 incorporating a recording head for recording information by accessing the magnetic disk 162 and an MR head for reproducing information is attached to the distal end of a suspension made of a thin leaf spring. The suspension is connected to one end of an arm 165.

A voice coil motor 167 as a kind of a linear motor is formed at the other end of the arm 165. The voice coil motor 167 includes a driving coil (not shown) wound on a bobbin of the arm 165, and a magnetic circuit including a permanent magnet and counter yoke facing each other so as to sandwich the driving coil between them.

The arm 165 is supported by ball bearings (not shown) formed in two, upper and lower portions of a fixed shaft 166, and swung by the voice coil motor 167. That is, the voice coil motor 167 controls the position of the slider 164 on the magnetic disk 162.

COMPARATIVE EXAMPLE 1

As a guide stamper, a stamper in which a preamble portion was written as a single zone from the inner circumference to the outer circumference as shown in FIG. 7(a) was manufactured. A groove width Win started with 78 nm so that three 30-nm pitch dot rows were initially arranged, and a width Wout on the outer circumferential side was 156 nm at a radial position of 23 mm. Following the same procedures as in Example 1, physical guides were formed on a substrate, a 30-nm pitch, self-organizing dot pattern master was manufactured, and the preamble portion was observed with an AFM. Consequently, the number of dot rows started with four in the inner circumference and increased in the radial direction toward the outer circumference. In a portion where the number of dot rows increased, defects occurred due to disordered arrays in several positions, like the defects shown in the regions F1 and F3 in FIG. 7(a). This stamper was used to manufacture a magnetic recording medium following the same procedures as in Example 1, and a signal in the preamble portion was evaluated by a spinstand. When the SNR profile of the signal was measured in the radial direction, the SNR was 15 dB in most portions as in Example 1, but decreased to 12 dB in several portions in the radial direction. When stamper images in these radial positions were observed with an SEM, regions having disordered arrays were found.

EXAMPLE 2

PS-PDMS 22-nm Pitch Dot Pattern

PS-PDMS was used as a diblock copolymer species to be filled in grooves. First, an experiment was conducted on a flat wafer having no guide in order to check the periodic length of a self-organizing structure. PS-PDMS (to be referred to as PS-PDMS #3 hereinafter) in which the number average molecular weight Mn of PS was 13,500, that of PDMS was 4,000, and the molecular weight dispersion was 1.07 was adjusted to 0.30 wt % by a toluene solvent, and a 3-inch wafer with no guide was spin-coated with the solution. Consequently, a 20-nm thick PS-PDMS film was obtained. This substrate was annealed in a vacuum at 180° C. for 12 hrs. Then, oxygen plasma etching was performed in an ICP (Inductively Coupled Plasma) etching apparatus, and the surface shape was observed with an SEM. As a result, a dot periodic structure having a pitch of 22 nm was observed.

A method of forming a bit patterned medium servo area by using 22-nm pitch PS-PDMS #3 described above will be explained below. Following the same procedures as in Example 1, a four-step guide which had the same arrangement as shown in FIG. 4 and in which the number m/z of magnetic dot regions was four was formed as a preamble portion pattern for lithography. When the pitch is 22 nm, calculations can be performed as shown in Table 4 below. Therefore, servo area guide patterns were formed to start with a 58-nm wide trapezoidal pattern for three rows of 22-nm pitch dots and end with the fourth 115-nm wide pattern for six rows. On the other hand, concentric circles having a groove width of 78 nm were formed at a pitch of 200 nm as recording tracks.

TABLE 4

| Number of rows | 3 | 4 | 5 | 6 |
|---|---|---|---|---|
| Groove width (nm) | 57.2 | 76.2 | 95.3 | 114.3 |

A bit patterned medium imprinting master was manufactured following the same procedures as in Example 1. In every trapezoidal groove, no spatial defect occurred, and an almost hexagonal array was formed. When the sample was observed with the AFM, the guide grooves disappeared, and only the dot projecting patterns were observed. A structure in which groups having ordered dot arrays were arranged in the radial direction like the polymer patterns was observed. Similar dot rows were confirmed even when performing observation with an electron microscope.

EXAMPLE 3

PS-PDMS 17-nm Pitch Dot Pattern

PS-PDMS #1 as a 17-nm pitch dot self-organizing structure was used as a diblock copolymer species to be filled in grooves.

As a bit patterned medium servo area using 17-nm pitch PS-PDMS #1, a four-step guide which had the same arrangement as shown in FIG. 4 and in which the number m/z of magnetic dot regions was four was formed as a preamble portion pattern for lithography following the same procedures as in Example 1. When the pitch is 17 nm, an optimum groove width is as shown in Table 2. Therefore, the patterns were formed to start with a 45-nm wide trapezoidal pattern for three rows and end with the fourth 81-nm wide pattern for six rows.

On the other hand, concentric circles having a groove width of 60 nm were formed at a pitch of 120 nm as recording tracks.

A bit patterned medium imprinting master was manufactured following the same procedures as in Example 1. In every trapezoidal groove, no spatial defect occurred, and an almost hexagonal array was formed. When the sample was observed with the AFM, the guide grooves disappeared, and only the dot projecting patterns were observed, although 17-nm pitch PS-PDMS #1 was used. A structure in which groups having ordered dot arrays were arranged in the radial direction like the polymer patterns was observed. Similar dot rows were confirmed even when performing observation with an electron microscope.

EXAMPLE 4

PS-PMMA 45-nm Pitch Dot Pattern

As a diblock copolymer to be filled in grooves, polystyrene-polymethacrylate (PS-PMMA) having a molecular weight of 89,300 (PS: 74,300, PMMA: 15,000, molecular weight dispersion Mw/Mn: 1.13) was prepared. This PS-PMMA was adjusted to 2.0 wt % by using PGMEA as a solvent, and a 3-inch silicon wafer with no guide was spin-coated with the solution. After that, the wafer was annealed in a vacuum at 180° C. for 15 hrs. When the film surface was observed with an AFM, PMMA dots were formed in a PS matrix, and had a periodic length of 45 nm.

TABLE 5

| Number of rows | 3 | 4 | 5 | 6 |
|---|---|---|---|---|
| Groove width (nm) | 116.9 | 155.9 | 194.9 | 233.8 |

A bit patterned medium servo area was formed as follows by using the 45-nm pitch self-organizing dots. Following the same procedures as in Example 1, a guide having the same arrangement as shown in FIG. 4 and having four steps from the inner circumference to the outer circumference was formed as a preamble portion pattern for lithography. When the pitch is 45 nm, an optimum groove width is as shown in Table 5. Therefore, the pattern was formed to start with a 117-nm wide trapezoidal pattern for three rows and end with the fourth 234-nm wide pattern for six rows. On the other hand, concentric circles having a groove width of 155 nm were formed at a pitch of 200 nm as recording tracks.

A self-organizing physical guide imprinting master was manufactured following the same procedures as in Example 1. Then, in the same manner as in Example 1, S1818 as a positive resist was diluted to 10 times the volume, and a 100-nm thick resist layer was formed on an Si substrate by spin coating (FIG. 14A). To perform pattern transfer in a post-process, a hard mask layer was formed on the Si substrate by stacking a 20-nm thick carbon layer and a 5-nm thick Si layer from the substrate side. The hard mask layer was deposited in an argon ion sputtering apparatus. After the patterns were transferred onto the resist by imprinting, the resist patterns were cured by performing annealing in a clean oven at 160° C. for 30 min (FIG. 14B). When observed with an AFM, the patterns had a height of 50 nm. An oxygen plasma etching apparatus was used to perform etching until the bottoms of pattern grooves reached the silicon substrate (FIG. 14C). This etching was performed at a pressure of 0.2 mTorr, an antenna power of 100 W, and a bias power of 100 W for 20 sec. When the arcuate groove on the inner circumferential side was measured with the AFM, the groove width in the circumferential direction was 117 nm. On the other hand, the width of the arcuate groove on the outer circumferential side was about 234 nm. The groove depth was 40 nm.

The substrate having the grooves formed as described above was coated with a solution of PS-PMMA described previously (FIG. 14D). That is, the solution was adjusted to 2.0 wt % by using PGMEA as a solvent, and the substrate was spin-coated with the solution at 3,000 rpm. After that, annealing was performed in a vacuum at 180° C. for 15 hrs, thereby separating the phase of PS-PMMA and forming a self-organizing dot structure (FIG. 14E).

After this annealing process, oxygen plasma etching was performed at 0.2 mTorr, an antenna power of 100 W, and a bias power of 100 W for 15 sec. When the substrate was observed with the AFM, the PMMA dots were selectively removed. This substrate was spin-coated with Spin-On-Glass (SOG) (available from TOKYO OHKA KOGYO). Subsequently, the surface SOG layer was removed by performing processing using $CF_4$ at 2.0 mTorr, an antenna power of 100 W, and a bias power of 100 W for 10 sec, and etching was performed until the PS layer was exposed. Then, an SOG dot mask was formed by performing oxygen plasma etching at 0.5 mTorr, an antenna power of 100 W, and a bias power of 100 W for 30 sec. When the substrate was observed with the AFM, 45-nm pitch, phase-separated dot patterns were found in a data portion and servo portion. In a preamble portion, SOG dots were found in a plurality of arcuate grooves, as shown in FIG. 4. In the innermost groove, three dot rows were formed in the radial direction as designed. In the second groove, five dot rows were formed in the radial direction. In the outermost large-diameter groove, the width in the circumferential direction was 234 nm, and six dot rows were formed in the radial direction. In every region, no spatial defect occurred, and an almost hexagonal array was formed (FIG. 14F). Then, the 5-nm thick Si hard mask was exposed to $CF_4$ plasma etching at 0.2 Pa, an antenna power of 50 W, and a coil power of 50 W for 15 sec, and the underlying 15-nm thick C hard mask was etched by oxygen plasma etching at 0.2 Pa, an antenna power of 100 W, and a coil power of 100 W for 35 sec, thereby transferring the patterns onto the hard mask (FIG. 14G). Subsequently, Si of the substrate was etched by $CF_4$ plasma etching at 0.2 Pa, an antenna power of 100 W, and a coil power of 100 W for 30 sec (FIG. 14H). Finally, the C hard mask was removed by performing oxygen plasma etching at 0.2 Pa, an antenna power of 100 W, and a coil power of 100 W for 40 sec, thereby manufacturing a silicon master (FIG. 14J). When the manufactured master was checked with the atomic force microscope, a structure in which groups having ordered dot arrays were arranged in the radial direction like the polymer patterns was observed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk-like magnetic recording medium comprising:
a servo area along an arc corresponding to a locus when a reproduction head moves on the magnetic recording medium in a cross track direction, the servo area comprising magnetic dots aligned at a pitch (L0),
wherein the magnetic dots comprise at least m magnetic dot regions in the cross track direction, where m is natural number equal to 2 or more, the magnetic dots formed on a surface of a magnetic recording layer by a method comprising:
forming a first stamper comprising a pectin pattern corresponding to at least m magnetic dot regions in a cross track direction, where m is natural number equal to 2 or more;
transferring the projecting pattern of the first stamper onto a resist layer on a substrate by:
imprinting,
forming a guide by curing the resist,
causing phase separation by applying a self-organizing material into the guide,
forming a self-organizing dot pattern corresponding to dots aligned at a pitch ($L_0$), and
forming a second stamper based on the self-organizing dot pattern;
preparing a magnetic recording medium comprising a substrate and a magnetic recording layer on the substrate;
forming a pattern transfer resist material coating layer on the magnetic recording layer;
adhering a pattern surface of the second stamper by using the coating layer;
curing the coating layer;
removing the second stamper;
forming a resist material layer on the magnetic recording layer, the resist material layer being cured after the transferring; and
dry-etching using the cured resist material layer as a mask, thereby forming the magnetic dots on a surface of the magnetic recording layer, and
wherein a width (Wm) in a down track direction of an m-th magnetic dot region from an innermost circumference of the magnetic recording medium, among the at least m magnetic dot regions, and a number of dot rows (Nm) in the down track direction of the m-th region satisfy the expression (1),
and the magnetic dots satisfying the expression (1) are in a preamble portion, $$L0\{Nm\sqrt{3}/2-0.23\} \leq Wm \leq L0\{Nm\sqrt{3}/2+0.24\} \quad (1)$$

wherein L0 ranges from 17 to 45 nm, and Nm is not more than 6.

2. The medium of claim 1, wherein the magnetic dots in the preamble portion are reference dots, and at least one of an address portion and a burst portion comprises the reference dots.

3. A magnetic recording/reproduction apparatus comprising:
a reproduction head attached to a pivotal actuator arm and configured to move on a magnetic recording medium in a cross track direction; and
a magnetic recording medium comprising:
a servo area along an arc corresponding to a locus when the reproduction head moves on the magnetic recording medium in a cross track direction,
wherein the servo area comprises magnetic dots aligned at a pitch (L0), the magnetic dots comprise at least m magnetic dot regions in the cross track direction, where m is natural number equal to 2 or more, the magnetic dots formed on a surface of a magnetic recording layer by a method comprising:

forming a first stamper comprising a projecting pattern corresponding to at least m magnetic dot regions in a cross track direction, where m is natural number equal to 2 or more;

transferring the projecting pattern of the first stamper onto a resist layer on a substrate by:

imprinting, forming a guide by curing the resist, causing phase separation by applying a self-organizing material into the guide, forming a self-organizing dot pattern corresponding to magnetic dots aligned at a pitch (L0), and forming a second stamper based on the self-organizing dot pattern;

preparing a magnetic recording medium comprising a substrate and a magnetic recording layer on the substrate;

forming a pattern transfer resist material coating layer on the magnetic recording layer;

adhering a pattern surface of the second stamper by using the coating layer;

curing the coating layer;

removing the second stamper;

forming a resist material layer on the magnetic recording layer, the resist material layer being cured after the transferring; and dry-etching using the cured resist material layer as a mask, thereby forming the magnetic dots on a surface of the magnetic recording layer, and a width (Wm) in a down track direction of an m-th magnetic dot region from an innermost circumference of the magnetic recording medium, among the at least m magnetic dot regions, and a number of dot rows (Nm) in the down track direction of the m-th region satisfy the expression (1), $$L0\{Nm\sqrt{3}/2-0.23\} \leq Wm \leq L0\{Nm\sqrt{3}/2+0.24\} \quad (1)$$

wherein L0 ranges from 17 to 45 nm, and Nm is not more than 6.

4. A method of manufacturing a magnetic recording medium comprising a servo area along an arc corresponding to a locus the method comprising:

forming a first stamper comprising a projecting pattern corresponding to at least m magnetic dot regions in a cross track direction, where m is natural number equal to 2 or more;

transferring the projecting pattern of the first stamper onto a resist layer on a substrate by:

imprinting, forming a guide by curing the resist, causing phase separation by applying a self-organizing material into the guide, forming a self-organizing dot pattern corresponding to magnetic dots aligned at a pitch (L0), and forming a second stamper based on the self-organizing dot pattern;

preparing a magnetic recording medium comprising a substrate and a magnetic recording layer on the substrate;

forming a pattern transfer resist material coating layer on the magnetic recording layer;

adhering a pattern surface of the second stamper by using the coating layer;

curing the coating layer;

removing the second stamper;

forming a resist material layer on the magnetic recording layer, the resist material layer being cured after the transferring; and dry-etching using the cured resist material layer as a mask, thereby forming the magnetic dots on a surface of the magnetic recording layer, wherein a width (Wm) in a down track direction of an m-th magnetic dot region from an innermost circumference of the magnetic recording medium, among the at least m magnetic dot regions, and a number Nm of dot rows in the down track direction of the m-th region satisfying the expression (1), and the magnetic dots satisfying the expression (1) are in a preamble portion:

$$L0\{Nm\sqrt{3}/2-0.23\} \leq Wm \leq L0\{Nm\sqrt{3}/2+0.24\} \quad (1).$$

5. The method of claim 4, wherein the magnetic dots in the preamble portion are regarded as reference dots, the method further comprising:

forming at least one of an address portion and a burst portion by combining the reference dots.

* * * * *